(12) United States Patent
Zhu et al.

(10) Patent No.: US 12,238,737 B2
(45) Date of Patent: Feb. 25, 2025

(54) TRANSMISSION BLOCK CONFIGURATION PARAMETER TRANSMISSION METHOD AND APPARATUS, AND COMMUNICATION DEVICE AND STORAGE MEDIUM

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Yajun Zhu, Beijing (CN); Wei Hong, Beijing (CN); Junli Li, Beijing (CN); Yong Li, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 457 days.

(21) Appl. No.: 17/780,515

(22) PCT Filed: Nov. 28, 2019

(86) PCT No.: PCT/CN2019/121769
§ 371 (c)(1),
(2) Date: May 26, 2022

(87) PCT Pub. No.: WO2021/102858
PCT Pub. Date: Jun. 3, 2021

(65) Prior Publication Data
US 2022/0417978 A1 Dec. 29, 2022

(51) Int. Cl.
*H04W 72/12* (2023.01)
*H04W 72/23* (2023.01)

(52) U.S. Cl.
CPC .................. *H04W 72/23* (2023.01)

(58) Field of Classification Search
CPC ............... H04W 72/23; H04W 72/232; H04W 72/0446; H04L 5/0091; H04L 5/0044; H04L 5/0053; H04L 1/1607
See application file for complete search history.

(56) References Cited

U.S. PATENT DOCUMENTS 9,107,087 B2   8/2015   Li et al.
9,590,749 B2   3/2017   Chen et al.
(Continued)

FOREIGN PATENT DOCUMENTS

CN   102291213 A   12/2011
CN   102404095 A   4/2012
(Continued)

OTHER PUBLICATIONS

International Search Report of International Application No. PCT/CN2019/121769 dated Aug. 26, 2020 with English translation, (2p).
(Continued)

*Primary Examiner* — John D Blanton
(74) *Attorney, Agent, or Firm* — Arch & Lake LLP; Hao Tan; Shen Wang

(57) ABSTRACT

A method for transmitting transmission block configuration parameter is provided. The method includes: sending first downlink control information (DCI) for scheduling a multi-transmission time interval transmission block, where the first DCI includes a preset indicator indicating that a configuration parameter that determines a transmission block size (TBS) of a retransmission TB scheduled by means of the first DCI is from the first DCI or second DCI, and the second DCI is DCI for scheduling a new transmission TB corresponding to the retransmission TB.

17 Claims, 5 Drawing Sheets

(56) References Cited

U.S. PATENT DOCUMENTS

| | | |
|---|---|---|
| 10,420,088 B2 | 9/2019 | Ang et al. |
| 10,548,163 B2 | 1/2020 | Li |
| 2013/0286884 A1 | 10/2013 | Li et al. |
| 2015/0249511 A1 | 9/2015 | Chen et al. |
| 2017/0215172 A1* | 7/2017 | Yang .................. H04L 27/2601 |
| 2017/0230994 A1 | 8/2017 | You et al. |
| 2017/0353947 A1 | 12/2017 | Alvarino et al. |
| 2018/0092071 A1 | 3/2018 | Dinan et al. |
| 2018/0160445 A1 | 6/2018 | Babaei et al. |
| 2018/0167967 A1 | 6/2018 | Li |
| 2019/0349978 A1 | 11/2019 | Lin et al. |
| 2020/0146047 A1 | 5/2020 | Li |
| 2021/0044391 A1* | 2/2021 | Lunttila ............ H04W 72/1268 |
| 2021/0144743 A1* | 5/2021 | Rastegardoost ...... H04W 72/23 |
| 2022/0070910 A1* | 3/2022 | Li ........................ H04L 1/1887 |
| 2022/0200835 A1* | 6/2022 | Shi .................. H04L 27/26025 |
| 2024/0163894 A1* | 5/2024 | Xiong .................. H04L 1/1854 |

FOREIGN PATENT DOCUMENTS

| | | |
|---|---|---|
| CN | 102595469 A | 7/2012 |
| CN | 107736073 A | 2/2018 |
| CN | 109120375 A | 1/2019 |
| CN | 109152071 A | 1/2019 |
| CN | 109219937 A | 1/2019 |
| CN | 110383748 A | 10/2019 |

OTHER PUBLICATIONS

3GPP TS 38.212 V15.5.0 (Mar. 2019), 3rd Generation Partnership Project; Technical Specification Group Radio Access Network; NR; Multiplexing and Channel Coding (Release 15), (101p).

3GPP TSG RAN WG1 Meeting #96bis, R1-190xxxx, Xi'an, China, Apr. 8-12, 2019, MCC Support, Draft Report of 3GPP TSG RAN WG1 #96 v0.1.0, (Athens, Greece, Feb. 25- Mar. 1, 2019), (149p).

3GPP TSG RAN WG1 Meeting #98bis, R1-190xxxx, Prague, Czech Rep, Aug. 26-30, 2019, MCC Support, Draft Report of 3GPP TSG RAN WG1 #97 v0.1.0, (Reno, NV, May 13-17, 2019), (153p).

Qualcomm Incorporated, "Enhancements to Scheduling and HARQ Operation for NR-U", 3GPP TSG RAN WG1 Meeting #98, R1-1909247, Prague, Czech Republic, Aug. 26-30, 2019, (19p).

* cited by examiner

TRANSMISSION BLOCK CONFIGURATION PARAMETER TRANSMISSION METHOD AND APPARATUS, AND COMMUNICATION DEVICE AND STORAGE MEDIUM

CROSS REFERENCE TO RELATED APPLICATION

The present application is a U.S. National Stage of International Application No. PCT/CN2019/121769, filed on Nov. 28, 2019, the entire contents of which are incorporated herein by reference for all purposes.

BACKGROUND

In a new radio based unlicensed access (NR-U) technique, single downlink control information (DCI) can be used to schedule a plurality of time interval or mini-time interval based physical uplink shared channel (PUSCH) resources for transmission of a transmission block. As shown in FIG. 1, a base station first transmits initial DCI, that is, an initial-downlink control information grant (Initial-DCI grant) 1 schedules user equipment to send a transmission block by using a PUSCH resource with an identifier (ID) of 1. When correctly decoding the PUSCH with ID1, the base station uses multi-transmission time interval (Multi-TTI) DCI, that is, a multi-downlink control information grant (multi-DCI grant) 2 to schedule the user equipment to transmit the transmission block by using the plurality of PUSCH resources, and after listen before talk (LBT) of a user succeeds, the PUSCH resources with IDs of 1, 2, 3 and 4 can be used to transmit the transmission block.

SUMMARY

According to a first aspect of the disclosure, provided is a method for transmitting transmission block configuration parameter. The method includes:
sending first DCI for scheduling a multi-transmission time interval transmission block, where the first DCI includes a preset indicator, the preset indicator is used for indicating that a configuration parameter that is used for determining a transmission block size (TBS) of a retransmission transmission block (TB) scheduled by means of the first DCI is from the first DCI or second DCI, and the second DCI is DCI for scheduling a new transmission TB corresponding to the retransmission TB.

According to a second aspect of the disclosure, provided is a method for determining transmission block configuration parameter. The method includes:
receiving first DCI used for scheduling a multi-transmission time interval transmission block; and
obtaining, according to a preset indicator included in the first DCI, a configuration parameter that is used for determining a TBS of a retransmission transmission block (TB) scheduled by means of the first DCI from the first DCI or second DCI, where the second DCI is DCI for scheduling a new transmission TB corresponding to the retransmission TB.

According to a third aspect of the disclosure, provided is a communication device. The communication device includes a processor, a transceiver, a memory, and an executable program stored on the memory and executable by the processor, where the processor executes, when running the executable program, steps of the method for transmitting transmission block configuration parameter according to the first aspect or steps of the method for determining transmission block configuration parameter according to the second aspect.

According to a fourth aspect of the disclosure, provided is a non-transitory storage medium. The storage medium stores an executable program, where the executable program implements, when executed by a processor, steps of the method for transmitting transmission block configuration parameter according to the first aspect or steps of the method for determining transmission block configuration parameter according to the second aspect.

It is to be understood that both the foregoing general description and the following detailed description are illustrative and explanatory and are not restrictive of examples of the disclosure.

BRIEF DESCRIPTION OF THE DRAWINGS

The accompanying drawings, which are incorporated in and constitute a part of this specification, illustrate examples consistent with the disclosure and, together with the specification, serve to explain the principles of the examples of the disclosure.

DETAILED DESCRIPTION

Figure 1:
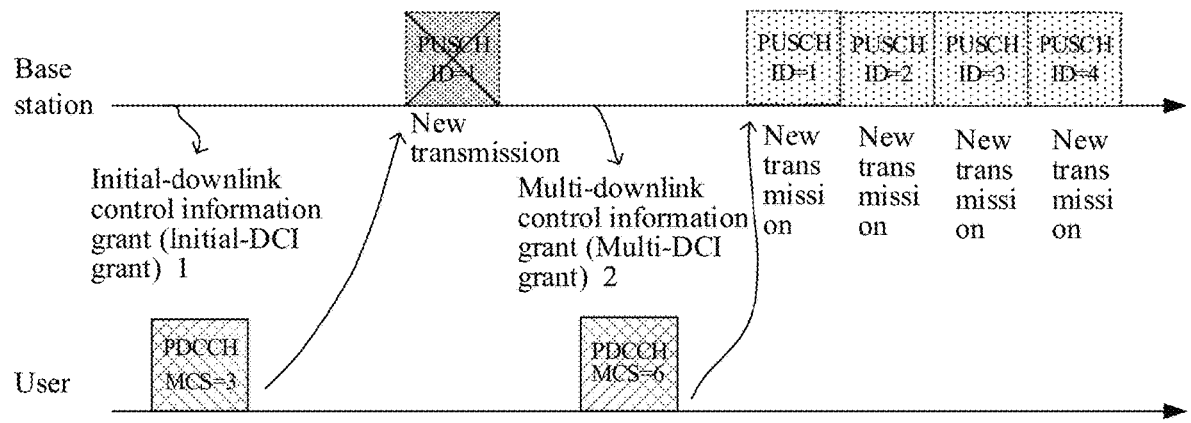
FIG. 1 is a schematic diagram showing an instance of scheduling a plurality of PUSCH resources by single DCI for transmission according to an example.

Description will herein be made in detail to examples, instances of which are illustrated in the accompanying drawings. When the following description refers to the accompanying drawings, the same numbers in different accompanying drawings refer to the same or similar elements unless otherwise indicated. The implementation modes described in the following examples do not represent all implementation modes consistent with the examples of the disclosure. Rather, they are merely instances of apparatus and methods consistent with some aspects of the examples of the disclosure as described in detail in the appended claims.

The term used in the examples of the disclosure is for the purpose of describing particular examples merely and is not intended to be restrictive of the examples of the disclosure. As used in the examples and the appended claims of the disclosure, singular forms "a", "said" and "the" are intended to include plural forms as well, unless the context clearly indicates otherwise. It is to be understood that the term "and/or" as used herein refers to and encompasses any or all possible combinations of one or more of the associated listed items.

It is to be understood that although the terms first, second, third, etc. may be employed in the examples of the disclosure to describe various information, such information should not be limited to these terms. These terms are merely used to distinguish the same type of information from each other. For example, first information may also be referred to as second information, and similarly, second information may also be referred to as first information, without departing from the scope of the examples of the disclosure. The word "if" as used herein may be construed to mean "upon" or "when" or "in response to determining", depending on the context.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

The present disclosure relates to the technical field of radio communication, but is not limited to the technical field of radio communication, and in particular relates to a method and apparatus for transmitting transmission block configuration parameter, a communication device and a storage medium.

Figure 2:
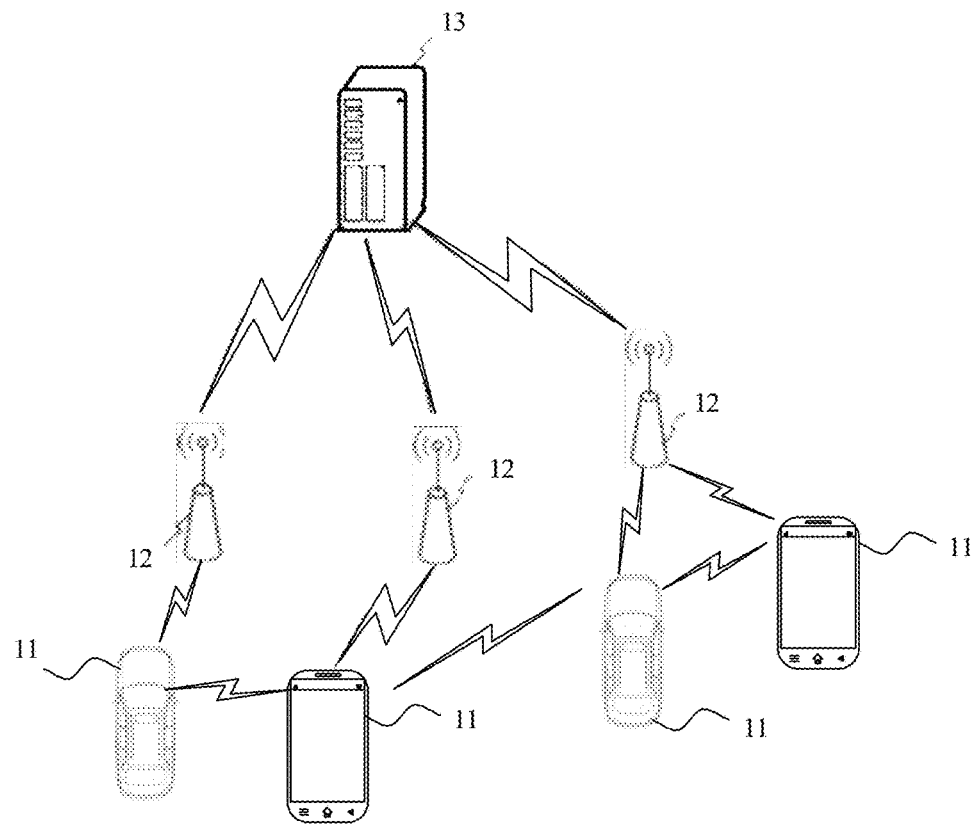
FIG. 2 is a structural schematic diagram of a radio communication system according to an example.

With reference to FIG. 2, a structural schematic diagram of a radio communication system provided in an example of the disclosure is shown. As shown in FIG. 2, the radio communication system is a communication system based on a cellular mobile communication technology. The radio communication system may include: several terminals 11 and several base stations 12.

The terminals 11 may be devices that provide speech and/or data connectivity for a user. Each of the terminals 11 may communicate with one or more core networks by means of a radio access network (RAN), and the terminal 11 may be an Internet of Things terminal, for example, a sensor device, a mobile telephone (or referred to as a "cellular" telephone), and a computer having an Internet of Things terminal, for example, may be a stationary, portable, pocket-sized, hand-held, computer-built, or vehicle-mounted device, for example, a station (STA), a subscriber unit, a subscriber station, a mobile station, a mobile, a remote station, an access point, a remote terminal, an access terminal, a user terminal, a user agent, a user device, or user equipment (UE). Alternatively, each of the terminals 11 may be a device of an unmanned aerial vehicle. Alternatively, each of the terminals 11 may be an in-vehicle device, for example, a trip computer with a radio communication function, or a radio communication device to which a trip computer is externally connected. Alternatively, each of the terminals 11 may be a roadside device, for example, a street lamp, a signal lamp, another roadside device, etc. with the radio communication function.

Each of the base stations 12 may be a network-side device in the radio communication system. The radio communication system may be the 4th generation mobile communication (4G) system, also referred to as a long term evolution (LTE) system; and alternatively, the radio communication system may also be a 5G system, also referred to as a new radio (NR) system or a 5G NR system. Alternatively, the radio communication system may also be a next generation system consecutive to the 5G system. An access network in the 5G system may be referred to as a new generation-radio access network (NG-RAN). Alternatively, the radio communication system may be a machine-type communication (MTC) system.

Each of the base stations 12 may be an evolved Node B (eNB) used in a 4G system. Alternatively, each of the base stations 12 may also be a next-generation Node B (gNB) using a central distributed architecture in a 5G system. When each of the base station 12 uses the central distributed architecture, it typically includes a central unit (CU) and at least two distributed units (DU). The central unit is provided with protocol stacks of a packet data convergence protocol (PDCP) layer, a radio link control (RLC) layer and a media access control (MAC) layer; and each distributed unit is provided with a protocol stack of a physical (PHY) layer. Examples of the disclosure are not limited to the specific implementation modes of the base station 12.

A radio connection may be established between the base stations 12 and the terminals 11 by means of radio air interfaces. In different implementation modes, the radio air interface is a radio air interface based on a 4th generation mobile communication network technology (4G) standard; alternatively, the radio air interface is a radio air interface based on a 5th generation mobile communication network technology (5G) standard, for example, the radio air interface is a new radio; and alternatively, the radio air interface may also be a radio air interface based on a 5G-based next generation mobile communication network technology standard.

In some examples, an end to end (E2E) connection may also be established between the terminals 11, for example, vehicle to vehicle (V2V) communication, vehicle to infrastructure (V2I) communication, vehicle to pedestrian (V2P) communication, and other scenes in vehicle to everything (V2X).

In some examples, the above radio communication system may further include a network management device 13.

The several base stations 12 are each connected to the network management device 13. The network management device 13 may be a core network device in the radio communication system, for example, the network management device 13 may be a mobility management entity (MME) in an evolved packet core (EPC). Alternatively, the network management device may be another core network device, for example, a serving gateway (SGW), a public data network gateway (PGW), a policy and charging rules function (PCRF), a home subscriber server (HSS), etc. An implementation form of the network management device 13 is not limited in the examples of the disclosure.

An execution body related to the examples of the disclosure includes, but is not limited to, a terminal, a base station, etc. supporting an NR-U technology of a 5th generation (5G) mobile communication technology.

Figure 3:
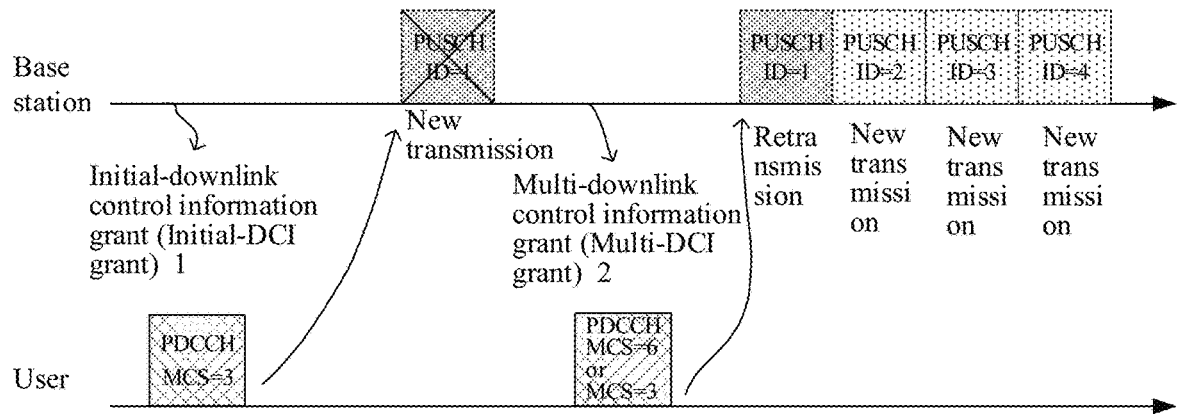
FIG. 3 is a schematic diagram showing another instance of scheduling a plurality of PUSCH resources by single DCI for transmission according to an example.

One application scene of the examples of the disclosure is, however, only one modulation and coding scheme (MCS) configuration parameter indication field is included in downlink control information (DCI) of the legacy 5G mobile communication technology. If a single MCS indication mechanism is still used in multi-transmission time interval scheduling of a new radio based unlicensed access, when a retransmission TB (transmission block, also referred to as transport block) and a new transmission TB both exist in a plurality of PUSCH resources using the multi-transmission time interval scheduling, the retransmission TB and the new transmission TB may use only one MCS. As shown in FIG. 3, a base station first sends an initial-downlink control information grant (Initial-DCI grant) 1 to schedule a PUSCH with an ID of 1 with an MCS of 3, and the base station end fails to decode the PUSCH with the ID of 1 due to strong interference at the base station side. If a multi-downlink control information grant (Multi-DCI grant) 2 with MCS of 6 is used for multi-transmission time interval PUSCH scheduling, a PUSCH resource with ID of 1 is used for the retransmission TB, and PUSCH resources with IDs of 2, 3 and 4 are used for the new transmission TB. After receiving the Multi-DCI grant 2, the user equipment computes a transmission block size (TBS, also referred to as transport block size) of the retransmission TB and a TBS of the new transmission TB by using parameters of MCS=6, etc. in the Multi-DCI grant 2; after the base station receives the retransmission TB, since the TBS of the retransmission TB is inconsistent with the TBS of the new transmission TB corresponding to the retransmission TB, merged decoding may not be carried out, and an effect of soft merging gain may not be achieved; and if the base station selects MCS=3 for all PUSCHs in order to achieve merged decoding of the retransmission TB and the corresponding new transmission TB, scheduling flexibility of the new transmission TB using the PUSCH resources with IDs of 2, 3 and 4 for transmission may be reduced to a great extent.

The related art adds a bitmap indicator in the NR-U DCI to indicate the MCS that is used for determining the TBS of each transmission block (also referred to as transport block). For a scene in which 4 PUSCH resources are scheduled, the bitmap may occupy 4 bits for indicating whether the MCS of the transmission block using the scheduled PUSCH resources for transmission is based on the MCS of the current DCI or the MCS in the DCI used for scheduling the new transmission TB corresponding to the retransmission TB. If the bit of a bitmap corresponding to the PUSCH resource is 1, the TBS of the retransmission TB is determined based on the MCS in the DCI used for scheduling the new transmission TB corresponding to the retransmission TB; and if the bit of the bitmap corresponding to the PUSCH resource is 0, the TBS of the retransmission TB is determined based on the MCS in the current DCI, such that the retransmission TB sent by the user equipment may be correctly received at a base station side and performing merged decoding with the corresponding new transmission TB.

Figure 4:
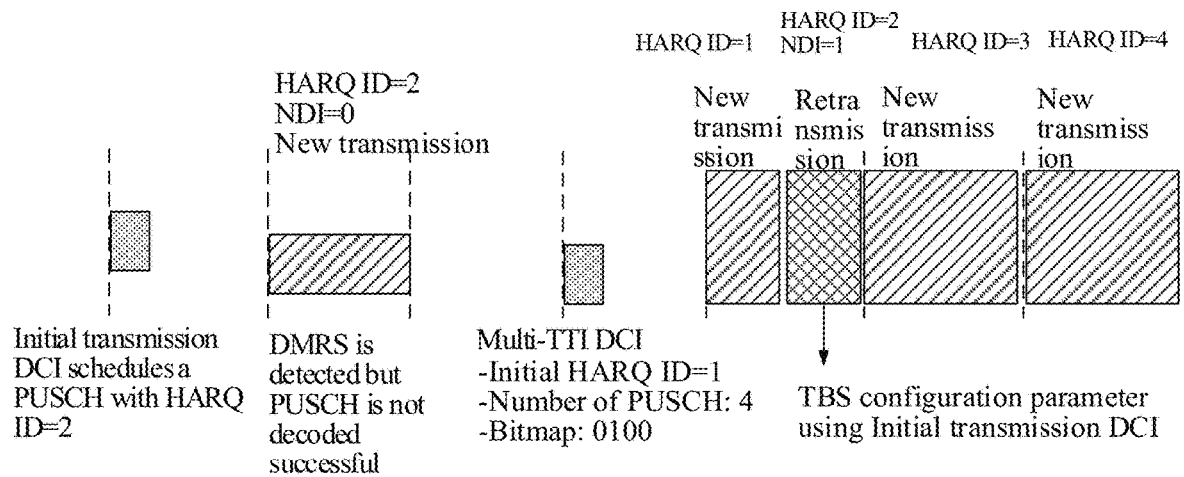
FIG. 4 is a schematic diagram showing an instance of indicating a TBS configuration parameter by using a bitmap according to an example.

As shown in FIG. 4, in scene 1, when the base station detects that a hybrid automatic repeat request (HARM) process ID 2 corresponds to a demodulation reference signal (DMRS) of an initial PUSCH resource but a transmission block transmitted by using the PUSCH resource is not decoded successful, the base station side has a merged decoding requirement, the base station is informed that the initial DCI is not lost, and then the base station may set the bit of the bitmap corresponding to an HARQ process ID 2 as 1 in subsequent multi-transmission time interval DCI, so as to instruct the user equipment to use the MCS in the previous DCI to determine the TBS of the retransmission TB.

Figure 5:
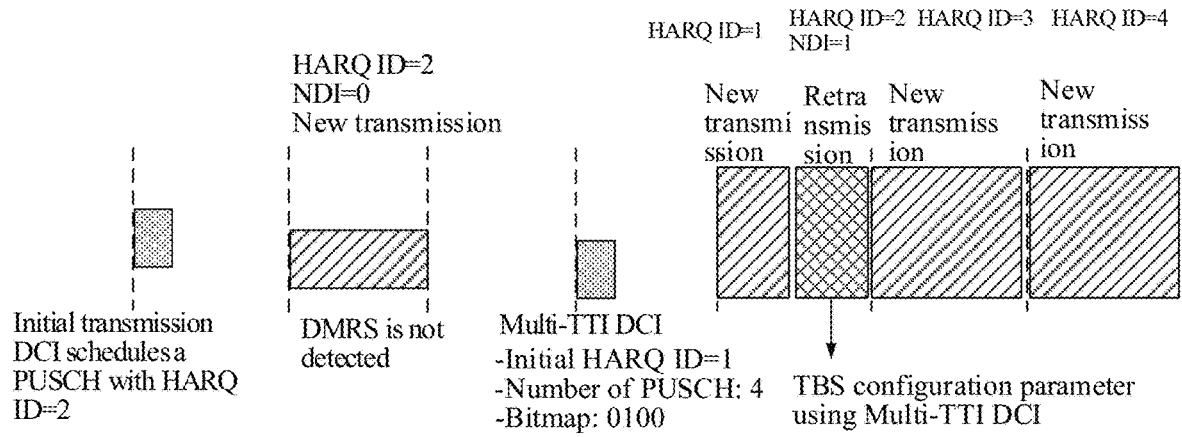
FIG. 5 is a schematic diagram showing another instance of indicating a TBS configuration parameter by using another bitmap according to an example.

As shown in FIG. 5, in scene 1, when the base station detects that the DMRS of the initial PUSCH does not correspond to the HARQ process ID 2, the base station end has no merged decoding requirement, the base station is uninformed whether the initial DCI is lost, and then the base station may set the bit of the bitmap corresponding to the HARQ process ID 2 as 0 in the subsequent multi-transmission time interval DCI, so as to indicate that the user needs to use a common MCS in the multi-transmission time interval DCI to determine the TBS of the retransmission TB.

However, if a multi-transmission time interval DCI schedules more PUSCHs, the bits of the bitmap may be increased rapidly, thus increasing the DCI overhead, which is contrary to a purpose of proposing a multi-transmission time interval DCI for reducing the DCI overhead.

Figure 6:
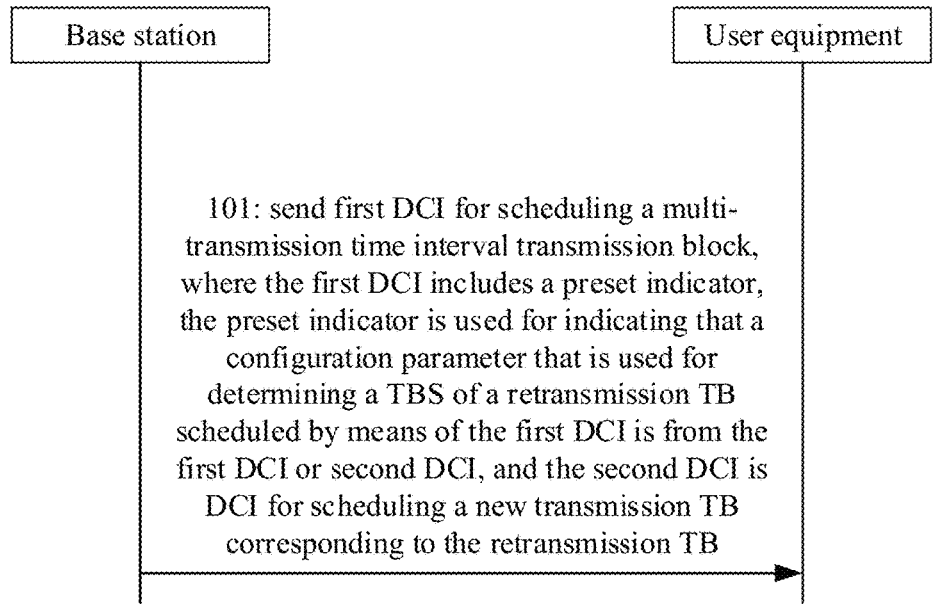
FIG. 6 is a flow diagram of a method for transmitting transmission block configuration parameter according to an example.

As shown in FIG. 6, the example provides a method for transmitting transmission block configuration parameter applicable to a base station of radio communication. The method includes:

Step 101: first DCI for scheduling a multi-transmission time interval transmission block is sent, where the first DCI includes a preset indicator, the preset indicator is used for indicating that a configuration parameter that is used for determining a TBS of a retransmission TB scheduled by means of the first DCI is from the first DCI or second DCI, and the second DCI is a DCI for scheduling a new transmission TB corresponding to the retransmission TB.

The first DCI may be DCI using a multi-transmission time interval technique to schedule a plurality of PUSCH resources for transmission of a plurality of transmission blocks with different contents. First DCI may schedule the plurality of PUSCH resources individually for transmission of the transmission blocks.

The second DCI may be initial DCI using the multi-transmission time interval technique to schedule a PUSCH resource for transmission of a different transmission block.

A TBS of the transmission block may be determined by configuration parameters, for example, MCS and a resource block (RB) number. Illustratively, the third generation partnership project (3GPP) makes a table of a corresponding relation between TBS and MCS as well as RB numbers. The TBS may be determined by the MCS and the RB number in a table look-up manner.

When the base station uses DCI to schedule a PUSCH resource to transmit a transmission block, a configuration parameter, for example, a configuration parameter, etc. of an MCS that is used for determining a TBS of the transmission block is carried in the DCI.

For a retransmission TB scheduled in the first DCI, a preset indicator may be set in the first DCI, and the preset indicator may occupy a fixed number of a bit, for example, 1 bit, in the first DCI. The preset indicator may take different values to indicate the configuration parameter that is used for determining the TBS of the retransmission TB.

If the base station needs to merged decode the retransmission TB and the corresponding new transmission TB, the retransmission TB needs to use the same configuration parameter as the corresponding new transmission TB to determine the TBS. In such a case, the base station may set a value of the preset indicator to indicate that a configuration parameter that is used for determining the TBS in the second DCI is used. Herein, the second DCI is used for scheduling the new transmission TB corresponding to a retransmission TB. A configuration parameter that is used for determining the TBS in the second DCI is used for determining the TBS of the new transmission TB corresponding to the retransmission TB. In this way, the retransmission TB and the corresponding new transmission TB use the same configuration parameter to determine the TBS, such that the retransmission TB and the corresponding new transmission TB may be merged decoding.

If the base station does not need to merged decode the retransmission TB and the corresponding new transmission TB, the retransmission TB may use the same configuration parameter as the new transmission TB scheduled by means of the first DCI to determine the TBS. In such a case, the base station may set a value of the preset indicator to indicate that a configuration parameter that is used for determining the TBS in the first DCI is used.

The configuration parameter that is used for determining the TBS in the first DCI is used for determining the TBS of the new transmission TB scheduled by means of the first DCI. The TBS of the new transmission TB scheduled by means of the first DCI may not be influenced by the preset indicator.

After receiving the first DCI, the user equipment may obtain the configuration parameter that is used for determining the TBS of the retransmission TB from the first DCI or the second DCI according to the indication of the preset indicator. The TBS of the retransmission TB is determined according to the obtained configuration parameter. For a new transmission TB scheduled in the first DCI, the configuration parameter may be obtained from the first DCI to determine the TBS of the new transmission TB.

In this way, for a newly transmitted data block scheduled by means of first DCI, user equipment may use a configuration parameter, used for determining a TBS, in the first DCI without being influenced by a retransmission TB; and for the retransmission TB, the base station may instruct the user equipment to select a configuration parameter that is used for determining the TBS according to whether merged decoding is needed. On one hand, flexibility of selecting a configuration parameter that is used for determining the TBS is improved. On the other hand, the number of bits occupied by a preset indicator does not increase along with an increase of the number of the transmission block scheduled by means of the first DCI, such that an influence of the preset indicator on first DCI overhead is reduced, so as to save transmission resources.

In an example, the preset indicator is used for indicating that a configuration parameter of a modulation and coding scheme (MCS) that is used for determining a TBS of a retransmission TB scheduled by means of first DCI is from the first DCI or second DCI.

The configuration parameter that is used for determining the TBS of the retransmission TB includes a configuration parameter of the MCS. The configuration parameters of the MCS include an MCS modulation index, etc. A plurality of MCS modulation indexes are defined in 3GPP, each MCS modulation index corresponding to a different MCS. Each MCS modulation index may correspond to a different TBS.

The first DCI or the second DCI has its own MCS index. When the preset indicator indicates that an MCS index in the first DCI is used for determining the TBS of the retransmission TB, user equipment obtains the MCS index from the first DCI and determines the TBS corresponding to the MCS index in a table look-up manner, etc.

When the preset indicator indicates that an MCS index in the second DCI is used for determining the TBS of the retransmission TB, the user equipment may obtain the MCS index from the stored second DCI and determine the TBS corresponding to the MCS index in a table look-up manner, etc. In this way, the retransmission TB and the corresponding new transmission TB use the same MCS index to determine the TBS, and the base station may merge the retransmission TB with the corresponding new transmission TB for decoding.

The user equipment may use the MCS index in the first DCI to determine the TBS of the new transmission TB scheduled by means of the first DCI.

In this way, for a newly transmitted data block scheduled by means of the first DCI, a TBS of the newly transmitted data block scheduled by means of the first DCI may be determined by using the MCS index in the first DCI without being influenced by the retransmission TB; and the retransmission TB scheduled by means of the first DCI may select, according to whether merged decoding is required, an MCS index from the first DCI or the second DCI to determine the TBS. The flexibility of selecting a configuration parameter of the MCS may be improved. In addition, the preset indicator is not influenced by the number of the transmission block scheduled by means of the first DCI, and the influence of the preset indicator on DCI overhead is reduced.

In an example, when the preset indicator is a first value, the preset indicator is used for indicating that the configuration parameter of the MCS that is used for determining the TBS of the retransmission TB scheduled by means of the first DCI is from the first DCI; and when the preset indicator is a second value, the preset indicator is used for indicating that the configuration parameter of the MCS that is used for determining the TBS of the retransmission TB scheduled by means of the first DCI is from the second DCI.

The preset indicator may occupy one bit. The first value and the second value are different, for example, the first value may be "0" and the second value may be "1"; and alternatively, the first value may be "1" and the second value may be "0".

Figure 7:
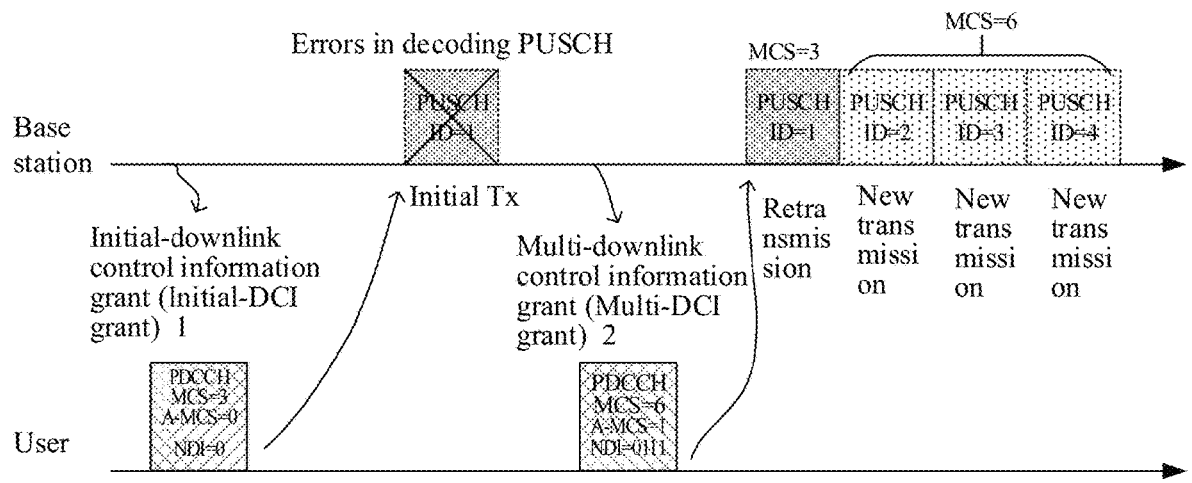
FIG. 7 is a schematic diagram showing an instance indicating a TBS configuration parameter by using a preset indicator according to an example.

Illustratively, the first value is "0" and the second value is "1". FIG. 7 shows a scene where a base station configures a retransmission TB and a corresponding new transmission TB to be merged decoding.

The base station first sends an Initial-DCI grant 1, that is, initial DCI, to schedule the user equipment to send a transmission block using a PUSCH resource with ID of 1, where an A-MCS in the Initial-DCI grant 1 is "0" by default, MCS=3, and an NDI corresponding to the PUSCH with ID of 1 is "0". The base station fails to decode the PUSCH resource with ID of 1 due to factors of interference, etc. in transmission when receiving the transmission block. The A-MCS is a preset indicator, and the NDI may be used for indicating whether a transmission block scheduled in the DCI is a retransmission TB or a new transmission TB.

In such a case, the base station schedules, in Multi-DCI grant 2, that is, multi-transmission time interval DCI, the user equipment to retransmit the transmission block transmitted by the PUSCH resource with ID 1, and instructs the new transmission TB to be transmitted together with the retransmission TB. Since a base station side has a merged decoding requirement, it is necessary to set A-MCS=1 to indicate that the TBS of the re-transmitted data block is determined by means of an MCS configuration parameter in the Initial-DCI grant 1. In the Multi-DCI grant 2, NDI=0111, NDI=1 flips to represent new transmission, NDI does not flip to represent retransmission, and it is indicated that PUSCH resources with IDs of 2, 3 and 4 are used for transmission of the new transmission TB and the PUSCH resource with ID of 1 is used for transmission of the retransmission TB.

After receiving the Multi-DCI grant 2, the user equipment determines that the PUSCH resource with ID of 1 is used for transmission of the retransmission TB and determines that the PUSCH resources with IDs of 2, 3 and 4 are used for transmission of the new transmission TB according to the indication of NDI=0111. According to A-MCS=1, the user equipment determines that the retransmission TB is not decoded successful at the base station side and has a merged decoding requirement, such that a determination mode of the TBS of the retransmission TB is determined according to the MCS configuration parameter of the Initial-DCI grant 1, that is, the TBS of the re-transmitted data block is determined by using MCS=3. The TBS of the newly transmitted data block is determined by using MCS=6 in the Multi-DCI grant 2.

Figure 8:
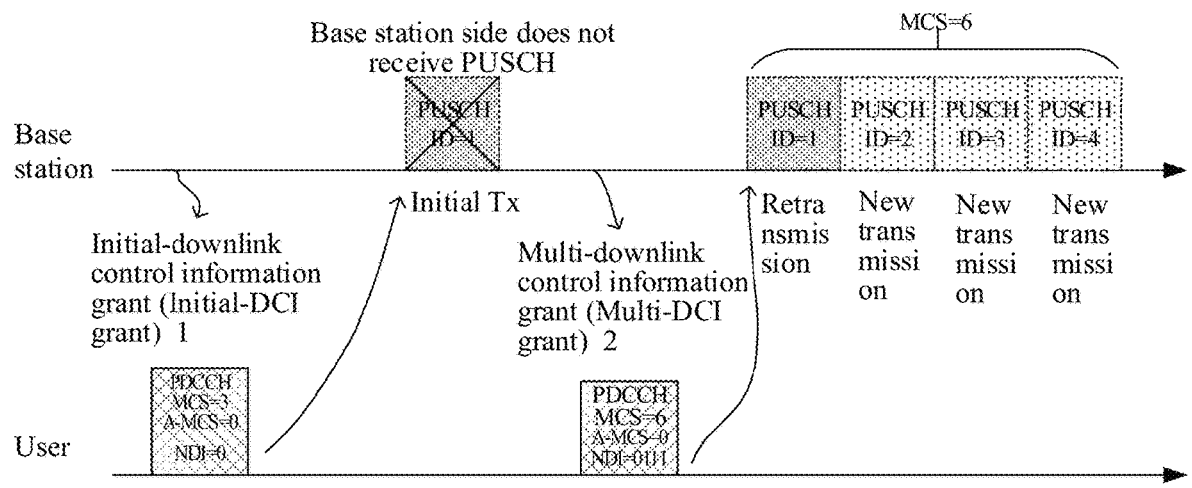
FIG. 8 is a schematic diagram showing another instance indicating a TBS configuration parameter by using a preset indicator according to an example.

FIG. 8 shows a scene where a base station configures a retransmission TB and a corresponding new transmission TB not to be merged decoding.

The base station first sends an Initial-DCI grant 1 to schedule the user equipment to send a transmission block by using a PUSCH resource with ID of 1, where an A-MCS in the Initial-DCI grant 1 is "0" by default, MCS=3, and an NDI corresponding to the PUSCH with ID of 1 is 0.

The base station side does not detect a transmission block sent by a PUSCH resource with ID of 1 due to reasons of listen before talk (LBT) failure, etc. of the user equipment, and then the base station is uninformed whether the Initial-DCI grant 1 is correctly received by the user equipment; and the base station schedules, on the Multi-DCI grant 2, the user equipment to retransmit the transmission block transmitted by the PUSCH resource with ID of 1, and instructs the new transmission TB and the retransmission TB to be sent together. Since the base station side has no merged decoding requirement, there is no need to indicate that the TBS of the retransmission TB is determined by means of the MCS configuration parameter in the Initial-DCI grant 1, and A-MCS=0 may be set in the Multi-DCI grant 2. NDI=0111, NDI=1 flips to represent new transmission, NDI does not flip to represent retransmission, and it is indicated that PUSCH resources with IDs of 2, 3 and 4 are used for transmission of the new transmission TB and the PUSCH resource with ID of 1 is used for transmission of the retransmission TB.

After receiving the Multi-DCI grant 2, a user determines that the PUSCH resource with ID of 1 is used for transmission of the retransmission TB and determines that the PUSCH resources with IDs of 2, 3 and 4 are used for transmission of the new transmission TB according to the indication of NDI=0111. According to A-MCS=0, the user equipment determines that the retransmission TB is not decoded successful at the base station side and has no merged decoding requirement, a determination mode of the TBS of the retransmission TB is determined according to the MCS configuration parameter in the Multi-DCI grant 2, that is, the TBS of the re-transmitted data block is determined by using MCS=6. The TBS of the newly transmitted data block is determined similarly by using MCS=6 in the Multi-DCI grant 2.

In an example, the method further includes: the preset indicator is set as the second value when the retransmission TB scheduled by means of the first DCI is used for performing merged decoding with the new transmission TB.

When the base station needs to merge the retransmission TB with the corresponding new transmission TB for decoding, it needs to be indicated that the retransmission TB uses the same configuration parameter for determining the TBS as the corresponding new transmission TB. Thus, the preset indicator may be set as the second value, so as to instruct the user equipment to obtain the configuration parameter for determining the TBS, that is, the MCS configuration parameter, from the second DCI.

After receiving the first DCI, the user equipment obtains the configuration parameter for determining the TBS from the second DCI according to the indication of the preset indicator, and then determines the TBS of the retransmission TB by using the obtained configuration parameter for determining the TBS.

In an example, the first DCI further includes: a new data indicator (NDI), the NDI being used for indicating that the transmission block scheduled by means of the first DCI and transmitted by means of a physical uplink shared channel (PUSCH) resource is a retransmission TB or a new transmission TB.

For the transmission block scheduled by means of the first DCI, the base station may carry an NDI in the DCI, the NDI occupies a plurality of bits, and each bit corresponds to a PUSCH with one ID. If the NDI corresponding to the PUSCH with same ID flips, it is indicated that the transmission block transmitted by using the PUSCH resource is a new transmission TB, and otherwise, it is indicated that the transmission block transmitted by using the PUSCH resource is a retransmission TB. Illustratively, the second DCI is DCI sent before the first DCI, the NDI corresponding to the PUSCH with ID1 in the second DCI is "0", and if the NDI corresponding to the PUSCH with ID1 in the first DCI is "0", it is indicated that the transmission block scheduled by means of the first DCI and transmitted by using the PUSCH resource with ID of 1 is a retransmission TB; and if the NDI corresponding to the PUSCH with ID1 in the first DCI is "1", it is indicated that the transmission block transmitted by using the PUSCH resource with ID of 1 is a new transmission TB.

The base station indicates that the transmission block transmitted in the PUSCH is a new transmission TB or a retransmission TB by means of the NDI in the DCI. After receiving the DCI, the user equipment determines whether the transmission block transmitted in each PUSCH is a new transmission TB or a retransmission TB, obtains a configuration parameter for determining the TBS according to the indication of the preset indicator, and determines the TBS for the retransmission TB.

Figure 9:
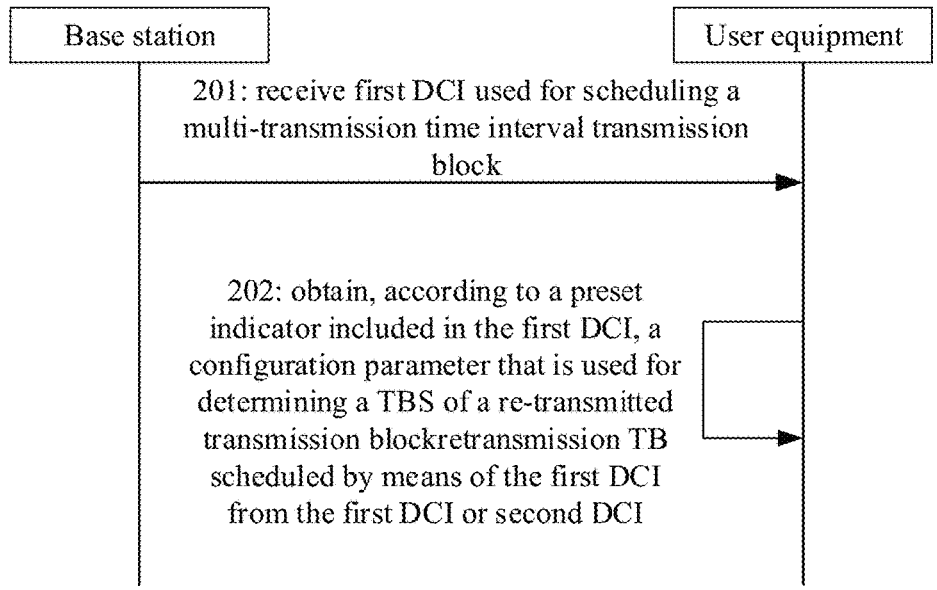
FIG. 9 is a flow diagram of a method for determining transmission block configuration parameter according to an example.

As shown in FIG. 9, the example provides a method for determining transmission block configuration parameter applicable to user equipment of radio communication. The method includes:

Step 201: first DCI used for scheduling a multi-transmission time interval transmission block is received; and Step 202: according to a preset indicator included in the first DCI, a configuration parameter that is used for determining a TBS of a retransmission TB scheduled by means of the first DCI is obtained from the first DCI or second DCI;

where the second DCI is a DCI for scheduling a new transmission TB corresponding to the retransmission TB.

The first DCI may be DCI using a multi-transmission time interval technique to schedule a plurality of PUSCH resources for transmission of a plurality of transmission blocks with different contents. First DCI may schedule the plurality of PUSCH resources individually for transmission of the transmission blocks.

The second DCI may be initial DCI using the multi-transmission time interval technique to schedule a PUSCH resource for transmission of a different transmission block.

A TBS of the transmission block may be determined by configuration parameters, for example, MCS and a resource block (RB) number. Illustratively, the third generation partnership project (3GPP) makes a table of a corresponding relation between TBS and MCS as well as RB numbers. The TBS may be determined by the MCS and the RB number in a table look-up manner.

When the base station uses DCI to schedule a PUSCH resource to transmit a transmission block, a configuration parameter, for example, a configuration parameter, etc. of an MCS that is used for determining a TBS of the transmission block is carried in the DCI.

For a retransmission TB scheduled in the first DCI, a preset indicator may be set in the first DCI, and the preset indicator may occupy a fixed number of a bit, for example, 1 bit, in the first DCI. The preset indicator may take different values to indicate the configuration parameter that is used for determining the TBS of the retransmission TB.

If the base station needs to merge the retransmission TB with the corresponding new transmission TB for decoding, the retransmission TB needs to use the same configuration parameter as the corresponding new transmission TB to determine the TBS. In such a case, the base station may set a value of the preset indicator to indicate that a configuration parameter that is used for determining the TBS in the second DCI is used. Herein, the second DCI is used for scheduling the new transmission TB corresponding to a retransmission TB. A configuration parameter that is used for determining the TBS in the second DCI is used for determining the TBS of the new transmission TB corresponding to the retransmission TB. In this way, the retransmission TB and the corresponding new transmission TB use the same configuration parameter to determine the TBS, such that the retransmission TB and the corresponding new transmission TB may be merged decoding.

If the base station does not need to merge the retransmission TB with the corresponding new transmission TB for decoding, the retransmission TB may use the same configuration parameter as the new transmission TB scheduled by means of the first DCI to determine the TBS. In such a case, the base station may set a value of the preset indicator to indicate that a configuration parameter that is used for determining the TBS in the first DCI is used.

The configuration parameter that is used for determining the TBS in the first DCI is used for determining the TBS of the new transmission TB scheduled by means of the first DCI. The TBS of the new transmission TB scheduled by means of the first DCI may not be influenced by the preset indicator.

After receiving the first DCI, the user equipment may obtain the configuration parameter that is used for determining the TBS of the retransmission TB from the first DCI or the second DCI according to the indication of the preset indicator. The TBS of the retransmission TB is determined according to the obtained configuration parameter. For a new transmission TB scheduled in the first DCI, the configuration parameter may be obtained from the first DCI to determine the TBS of the new transmission TB.

In this way, for a newly transmitted data block scheduled by means of first DCI, user equipment may use a configuration parameter, used for determining a TBS, in the first DCI without being influenced by a retransmission TB; and for the retransmission TB, the base station may instruct the user equipment to select a configuration parameter that is used for determining the TBS according to whether merged decoding is needed. On one hand, flexibility of selecting a configuration parameter that is used for determining the TBS is improved. On the other hand, the number of bits occupied by a preset indicator does not increase along with an increase of the number of the transmission block scheduled by means of the first DCI, such that an influence of the preset indicator on first DCI overhead is reduced, so as to save transmission resources.

In an example, the step that according to a preset indicator included in the first DCI, a configuration parameter that is used for determining a TBS of a retransmission TB scheduled by means of the first DCI is obtained from the first DCI or second DCI includes:

according to the preset indicator included in the first DCI, a configuration parameter of a modulation and coding scheme (MCS) that is used for determining the TBS of the retransmission TB is obtained from the first DCI or the second DCI.

The configuration parameter that is used for determining the TBS of the retransmission TB includes a configuration parameter of the MCS. The configuration parameters of the MCS include an MCS modulation index, etc. A plurality of MCS modulation indexes are defined in 3GPP, each MCS modulation index corresponding to a different MCS. Each MCS modulation index may correspond to a different TBS.

The first DCI or the second DCI has its own MCS index. When the preset indicator indicates that an MCS index in the first DCI is used for determining the TBS of the retransmission TB, user equipment obtains the MCS index from the first DCI and determines the TBS corresponding to the MCS index in a table look-up manner, etc.

When the preset indicator indicates that an MCS index in the second DCI is used for determining the TBS of the retransmission TB, the user equipment may obtain the MCS index from the stored second DCI and determine the TBS corresponding to the MCS index in a table look-up manner, etc. In this way, the retransmission TB and the corresponding new transmission TB use the same MCS index to determine the TBS, and the base station may merge the retransmission TB with the corresponding new transmission TB for decoding.

The user equipment may use the MCS index in the first DCI to determine the TBS of the new transmission TB scheduled by means of the first DCI.

In this way, for a newly transmitted data block scheduled by means of the first DCI, a TBS of the newly transmitted data block scheduled by means of the first DCI may be determined by using the MCS index in the first DCI without being influenced by the retransmission TB; and the retransmission TB scheduled by means of the first DCI may select, according to whether merged decoding is required, an MCS index from the first DCI or the second DCI to determine the TBS. The flexibility of selecting a configuration parameter of the MCS may be improved. In addition, the preset indicator is not influenced by the number of the transmission block scheduled by means of the first DCI, and the influence of the preset indicator on DCI overhead is reduced.

In an example, the step that according to the preset indicator included in the first DCI, a configuration parameter of a modulation and coding scheme (MCS) that is used for determining the TBS of the retransmission TB is obtained from the first DCI or the second DCI includes:

when the preset indicator is a first value, the configuration parameter of the MCS that is used for determining the TBS of the retransmission TB is obtained from the first DCI; and when the preset indicator is a second value, the configuration parameter of the MCS that is used for determining the TBS of the retransmission TB is obtained from the second DCI.

The preset indicator may occupy one bit. The first value and the second value are different, for example, the first value may be "0" and the second value may be "1"; and alternatively, the first value may be "1" and the second value may be "0".

Illustratively, the first value is "0" and the second value is "1". FIG. 7 shows a scene where a base station configures a retransmission TB and a corresponding new transmission TB to be merged decoding.

The base station first sends an Initial-DCI grant 1, that is, initial DCI, to schedule the user equipment to send a transmission block using a PUSCH resource with ID of 1, where an A-MCS in the Initial-DCI grant 1 is "0" by default, MCS=3, and an NDI corresponding to the PUSCH with ID of 1 is "0". The base station fails to decode the PUSCH resource with ID of 1 due to factors of interference, etc. in transmission when receiving the transmission block. The A-MCS is a preset indicator, and the NDI may be used for indicating whether a transmission block scheduled in the DCI is a retransmission TB or a new transmission TB.

In such a case, the base station schedules, in Multi-DCI grant 2, that is, multi-transmission time interval DCI, the user equipment to retransmit the transmission block transmitted by the PUSCH resource with ID 1, and instructs the new transmission TB to be transmitted together with the retransmission TB. Since a base station side has a merged decoding requirement, it is necessary to set A-MCS=1 to indicate that the TBS of the re-transmitted data block is determined by means of an MCS configuration parameter in the Initial-DCI grant 1. In the Multi-DCI grant 2, NDI=0111, NDI=1 flips to represent new transmission, NDI does not flip to represent retransmission, and it is indicated that PUSCH resources with IDs of 2, 3 and 4 are used for transmission of the new transmission TB and the PUSCH resource with ID of 1 is used for transmission of the retransmission TB.

After receiving the Multi-DCI grant 2, the user equipment determines that the PUSCH resource with ID of 1 is used for transmission of the retransmission TB and determines that the PUSCH resources with IDs of 2, 3 and 4 are used for transmission of the new transmission TB according to the indication of NDI=0111. According to A-MCS=1, the user equipment determines that the retransmission TB is not decoded successful at the base station side and has a merged decoding requirement, such that a determination mode of the TBS of the retransmission TB is determined according to the MCS configuration parameter of the Initial-DCI grant 1, that is, the TBS of the re-transmitted data block is determined by using MCS=3. The TBS of the newly transmitted data block is determined by using MCS=6 in the Multi-DCI grant 2.

FIG. 8 shows a scene where a base station configures a retransmission TB and a corresponding new transmission TB not to be merged decoding.

The base station first sends an Initial-DCI grant 1 to schedule the user equipment to send a transmission block by using a PUSCH resource with ID of 1, where an A-MCS in the Initial-DCI grant 1 is "0" by default, MCS=3, and an NDI corresponding to the PUSCH with ID of 1 is 0.

The base station side does not detect a transmission block sent by a PUSCH resource with ID of 1 due to reasons of listen before talk (LBT) failure, etc. of the user equipment, and then the base station is uninformed whether the Initial-DCI grant 1 is correctly received by the user equipment; and the base station schedules, on the Multi-DCI grant 2, the user equipment to retransmit the transmission block transmitted by the PUSCH resource with ID of 1, and instructs the new transmission TB and the retransmission TB to be sent together. Since the base station side has no merged decoding requirement, there is no need to indicate that the TBS of the retransmission TB is determined by means of the MCS configuration parameter in the Initial-DCI grant 1, and A-MCS=0 may be set in the Multi-DCI grant 2. NDI=0111, NDI=1 flips to represent new transmission, NDI does not flip to represent retransmission, and it is indicated that PUSCH resources with IDs of 2, 3 and 4 are used for transmission of the new transmission TB and the PUSCH resource with ID of 1 is used for transmission of the retransmission TB.

After receiving the Multi-DCI grant 2, a user determines that the PUSCH resource with ID of 1 is used for transmission of the retransmission TB and determines that the PUSCH resources with IDs of 2, 3 and 4 are used for transmission of the new transmission TB according to the indication of NDI=0111. According to A-MCS=0, the user equipment determines that the retransmission TB is not decoded successful at the base station side and has no merged decoding requirement, a determination mode of the TBS of the retransmission TB is determined according to the MCS configuration parameter in the Multi-DCI grant 2, that is, the TBS of the re-transmitted data block is determined by using MC S=6. The TBS of the newly transmitted data block is determined similarly by using MC S=6 in the Multi-DCI grant 2.

In an example, the first DCI further includes: a new data indicator (NDI), the NDI being used for indicating that the transmission block scheduled by means of the first DCI and transmitted by means of a physical uplink shared channel (PUSCH) resource is a retransmission TB or a new transmission TB.

For the transmission block scheduled by means of the first DCI, the base station may carry an NDI in the DCI, the NDI occupies a plurality of bits, and each bit corresponds to a PUSCH with one ID. If the NDI corresponding to the PUSCH with same ID flips, it is indicated that the transmission block transmitted by using the PUSCH resource is a new transmission TB, and otherwise, it is indicated that the transmission block transmitted by using the PUSCH resource is a retransmission TB. Illustratively, the second DCI is DCI sent before the first DCI, the NDI corresponding to the PUSCH with ID1 in the second DCI is "0", and if the NDI corresponding to the PUSCH with ID1 in the first DCI is "0", it is indicated that the transmission block scheduled by means of the first DCI and transmitted by using the PUSCH resource with ID of 1 is a retransmission TB; and if the NDI corresponding to the PUSCH with ID1 in the first DCI is "1", it is indicated that the transmission block transmitted by using the PUSCH resource with ID of 1 is a new transmission TB.

The base station indicates that the transmission block transmitted in the PUSCH is a new transmission TB or a retransmission TB by means of the NDI in the DCI. After receiving the DCI, the user equipment determines whether the transmission block transmitted in each PUSCH is a new transmission TB or a retransmission TB, obtains a configuration parameter for determining the TBS according to the indication of the preset indicator, and determines the TBS for the retransmission TB.

A specific example is provided below in conjunction with any one of the examples described above:

FIG. 7 shows a scene where a base station configures a retransmission TB and a corresponding new transmission TB to be merged decoding.

The base station first sends an Initial-DCI grant 1, that is, initial DCI, to schedule the user equipment to send a transmission block using a PUSCH resource with ID of 1, where an A-MCS in the Initial-DCI grant 1 is 0 by default, MCS=3, and an NDI corresponding to the PUSCH with ID of 1 is "0". The base station fails to decode the PUSCH resource with ID of 1 due to factors of interference, etc. in transmission when receiving the transmission block. The A-MCS is a preset indicator, and the NDI may be used for indicating whether a transmission block scheduled in the DCI is a retransmission TB or a new transmission TB.

In such a case, the base station schedules, in Multi-DCI grant 2, that is, multi-transmission time interval DCI, the user equipment to retransmit the transmission block transmitted by the PUSCH resource with ID 1, and instructs the new transmission TB to be transmitted together with the retransmission TB. Since a base station side has a merged decoding requirement, it is necessary to set A-MCS=1 to indicate that the TBS of the re-transmitted data block is determined by means of an MCS configuration parameter in the Initial-DCI grant 1. In the Multi-DCI grant 2, NDI=0111, NDI=1 flips to represent new transmission, NDI does not flip to represent retransmission, and it is indicated that PUSCH resources with IDs of 2, 3 and 4 are used for transmission of the new transmission TB and the PUSCH resource with ID of 1 is used for transmission of the retransmission TB.

After receiving the Multi-DCI grant 2, the user equipment determines that the PUSCH resource with ID of 1 is used for transmission of the retransmission TB and determines that the PUSCH resources with IDs of 2, 3 and 4 are used for transmission of the new transmission TB according to the indication of NDI=0111. According to A-MCS=1, the user equipment determines that the retransmission TB is not decoded successful at the base station side and has a merged decoding requirement, such that a determination mode of the TBS of the retransmission TB is determined according to the MCS configuration parameter of the Initial-DCI grant 1, that is, the TBS of the re-transmitted data block is determined by using MCS=3. The TBS of the newly transmitted data block is determined by using MCS=6 in the Multi-DCI grant 2.

FIG. 8 shows a scene where a base station configures a retransmission TB and a corresponding new transmission TB not to be merged decoding.

The base station first sends an Initial-DCI grant 1 to schedule the user equipment to send a transmission block by using a PUSCH resource with ID of 1, where an A-MCS in the Initial-DCI grant 1 is 0 by default, MCS=3, and an NDI corresponding to the PUSCH with ID of 1 is 0.

The base station side does not detect a transmission block sent by a PUSCH resource with ID of 1 due to reasons of listen before talk (LBT) failure, etc. of the user equipment, and then the base station is uninformed whether the Initial-DCI grant 1 is correctly received by the user equipment; and the base station schedules, on the Multi-DCI grant 2, the user equipment to retransmit the transmission block transmitted by the PUSCH resource with ID of 1, and instructs the new transmission TB and the retransmission TB to be sent together. Since the base station side has no merged decoding requirement, there is no need to indicate that the TBS of the retransmission TB is determined by means of the MCS configuration parameter in the Initial-DCI grant 1, and A-MCS=0 may be set in the Multi-DCI grant 2. NDI=0111, NDI=1 flips to represent new transmission, NDI does not flip to represent retransmission, and it is indicated that PUSCH resources with IDs of 2, 3 and 4 are used for transmission of the new transmission TB and the PUSCH resource with ID of 1 is used for transmission of the retransmission TB.

After receiving the Multi-DCI grant 2, a user determines that the PUSCH resource with ID of 1 is used for transmission of the retransmission TB and determines that the PUSCH resources with IDs of 2, 3 and 4 are used for transmission of the new transmission TB according to the indication of NDI=0111. According to A-MCS=0, the user equipment determines that the retransmission TB is not decoded successful at the base station side and has no merged decoding requirement, a determination mode of the TBS of the retransmission TB is determined according to the MCS configuration parameter in the Multi-DCI grant 2, that is, the TBS of the re-transmitted data block is determined by using MCS=6. The TBS of the newly transmitted data block is determined similarly by using MCS=6 in the Multi-DCI grant 2.

For the solution proposed in the disclosure, a base station side and a user equipment side are modified as follows:

The base station side: a base station first determines a decoding condition of a transmission block, scheduled by means of initial DCI, on a PUSCH resource; if the base station has a requirement for merging a retransmission TB with a corresponding new transmission TB for decoding, A-MCS=1 is set to instruct user equipment to determine a TBS of the retransmission TB by using a configuration parameter, that is used for determining the TBS, in the DCI scheduling a newly transmitted data block corresponding to the retransmission TB; and if the base station side has no merged decoding requirement, A-MCS=0 is set to instruct the user to determine the TBS of the retransmission TB by using the configuration parameters, that is used for determining the TBS, in current DCI.

The user side: if the user side receives an indication of A-MCS=1, the TBS of the retransmission TB is determined by using the configuration parameters, that is used for determining the TBS, in the DCI scheduling the newly transmitted data block corresponding to the retransmission TB, and the TBS of the new transmission TB is determined by using the configuration parameter, that is used for determining the TBS, in the current DCI. If the indication of A-MCS=0 is received, the TBS of all the currently scheduled transmission blocks are determined by using the configuration parameter, that is used for determining the TBS, in the current DCI.

Figure 10:
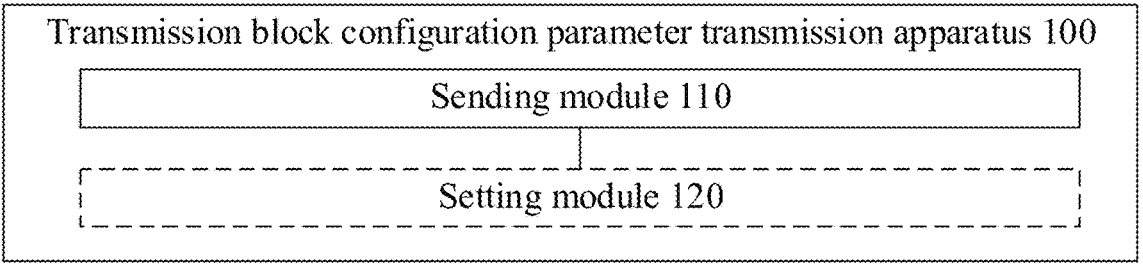
FIG. 10 is a structural block diagram of composition of an apparatus for transmitting transmission block configuration parameter according to an example.

The examples of the disclosure further provide an apparatus for transmitting transmission block configuration parameter, used in a base station of radio communication. FIG. 10 is a structural schematic diagram of composition of the apparatus 100 for transmitting transmission block configuration parameter provided in the example of the disclosure. As shown in FIG. 10, the apparatus 100 includes: a sending module 110, where the sending module 110 is configured to send first DCI for scheduling a multi-transmission time interval transmission block, the first DCI includes a preset indicator, the preset indicator is used for indicating that a configuration parameter that is used for determining a TBS of a retransmission TB scheduled by means of the first DCI is from the first DCI or second DCI, and the second DCI is a DCI for scheduling a new transmission TB corresponding to the retransmission TB.

In an example, the preset indicator is used for indicating that a configuration parameter of a modulation and coding scheme (MCS) that is used for determining a TBS of a retransmission TB scheduled by means of first DCI is from the first DCI or second DCI.

In an example, when the preset indicator is a first value, the preset indicator is used for indicating that the configuration parameter of the MCS that is used for determining the TBS of the retransmission TB scheduled by means of the first DCI is from the first DCI; and when the preset indicator is a second value, the preset indicator is used for indicating that the configuration parameter of the MCS that is used for determining the TBS of the retransmission TB scheduled by means of the first DCI is from the second DCI.

In an example, the apparatus 100 further includes:

a setting module 120 configured to set the preset indicator as the second value when the retransmission TB scheduled by means of the first DCI is used for performing merged decoding with the new transmission TB.

In an example, the first DCI further includes: a new data indicator (NDI), the NDI being used for indicating that the transmission block scheduled by means of the first DCI and transmitted by means of a physical uplink shared channel (PUSCH) resource is a retransmission TB or a new transmission TB.

Figure 11:
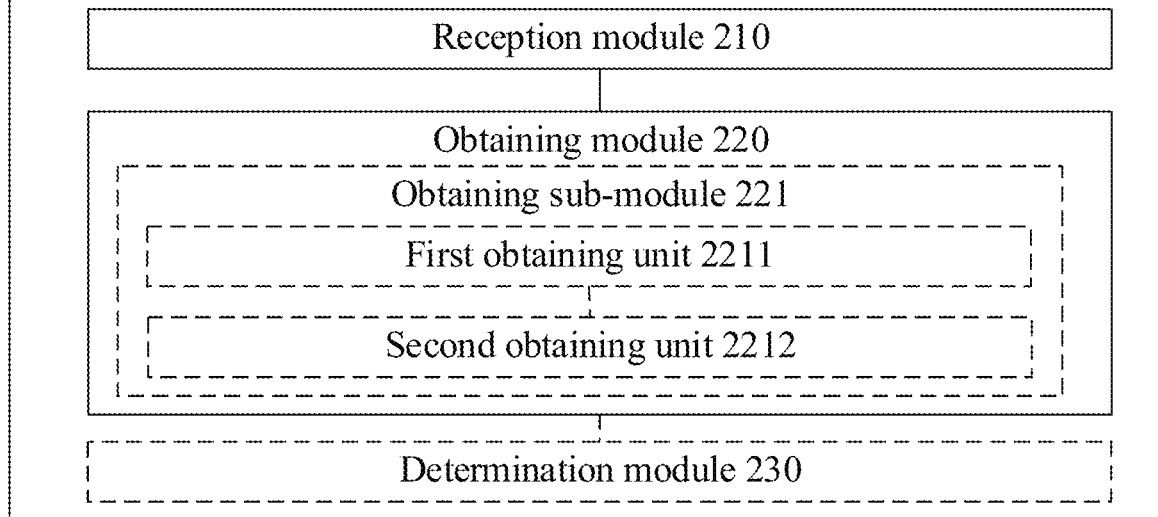
FIG. 11 is a structural block diagram of composition of an apparatus for determining transmission block configuration parameter according to an example.

An example of the disclosure further provides an apparatus for determining transmission block configuration parameter, used in user equipment of radio communication. FIG. 11 is a structural schematic diagram of composition of the apparatus for determining transmission block configuration parameter 200 provided in the example of the disclosure. As shown in FIG. 11, the apparatus 200 includes: a reception module 210 and an obtaining module 220, where the reception module 210 is configured to receive first DCI used for scheduling a multi-transmission time interval transmission block; and the obtaining module 220 is configured to obtain, according to a preset indicator included in the first DCI, a configuration parameter that is used for determining a TBS of a retransmission TB scheduled by means of the first DCI from the first DCI or second DCI;

where the second DCI is a DCI for scheduling a new transmission TB corresponding to the retransmission TB.

In an example, the obtaining module 220 includes:

an obtaining sub-module 221 configured to obtain, according to the preset indicator included in the first DCI, a configuration parameter of a modulation and coding scheme (MCS) that is used for determining the TBS of the retransmission TB from the first DCI or the second DCI.

In an example, the obtaining sub-module 221 includes:

a first obtaining unit 2211 configured to obtain, from the first DCI when the preset indicator is a first value, the configuration parameter of the MCS that is used for determining the TBS of the retransmission TB; and a second obtaining unit 2212 configured to obtain, from the second DCI when the preset indicator is a second value, the configuration parameter of the MCS that is used for determining the TBS of the retransmission TB.

In an example, the apparatus 200 further includes:

a determination module 230 configured to determine, according to a new data indicator (NDI) included in the first DCI, the retransmission TB scheduled by means of the first DCI and transmitted by means of a physical uplink shared channel (PUSCH) resource.

In an example, a sending module 110, a setting module 120, a reception module 210, an obtaining module 220, a determination module 230, etc. may be implemented by one or more central processing units (CPUs), a graphics processing unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic components, so as to execute the method described above.

Figure 12:
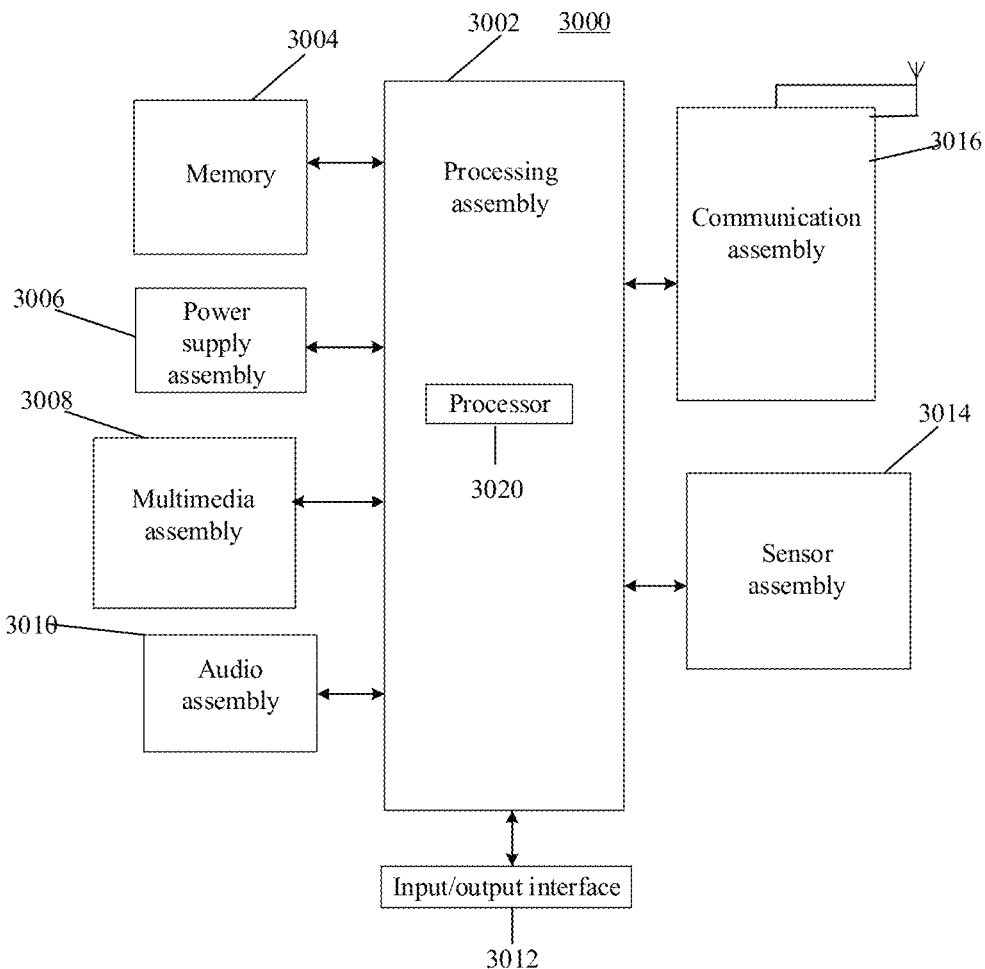
FIG. 12 is a block diagram of an apparatus for transmitting or determining transmission block configuration parameter according to an example.

FIG. 12 is a block diagram of an apparatus 3000 for transmitting transmission block configuration parameter or determining transmission block configuration parameter according to an example. For example, the apparatus 3000 may be a mobile phone, a computer, a digital broadcast terminal, a messaging device, a gaming console, a tablet device, a medical device, a fitness device, a personal digital assistant, etc.

With reference to FIG. 12, the apparatus 3000 may include one or more of a processing assembly 3002, a memory 3004, a power supply assembly 3006, a multimedia assembly 3008, an audio assembly 3010, an input/output (I/O) interface 3012, a sensor assembly 3014, and a communication assembly 3016.

The processing assembly 3002 generally controls overall operations of the apparatus 3000, for example, operations associated with display, phone calls, data communications, camera operations, and recording operations. The processing assembly 3002 may include one or more processors 3020 to execute an instruction to complete all or some of the steps of the method described above. Moreover, the processing assembly 3002 may include one or more modules to facilitate interaction between the processing assembly 3002 and other assemblies. For example, the processing assembly 3002 may include the multimedia module to facilitate interaction between the multimedia assembly 3008 and the processing assembly 3002.

The memory 3004 is configured to store various types of data to support operation on the apparatus 3000. Examples of such data include an instruction, operated on the apparatus 3000, for any application or method, contact data, phonebook data, messages, pictures, video, etc. The memory 3004 may be implemented by any type of volatile or non-volatile memory apparatus, or their combination, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 3006 provides power for the various assemblies of the apparatus 3000. The power supply assembly 3006 may include a power management system, one or more power supplies, and other assemblies associated with power generating, managing, and distributing for the apparatus 3000.

The multimedia assembly 3008 includes a screen that provides an output interface between the apparatus 3000 and the user. In some examples, the screen may include a liquid crystal display (LCD) and a touch panel (TP). Under the condition that the screen includes the touch panel, the screen may be implemented as a touch screen to receive an input signal from the user. The touch panel includes one or more touch sensors to sense touches, slides, and gestures on the touch panel. The touch sensor may not only sense a boundary of a touch or swipe action, but also detect duration and pressure related to the touch or swipe operation. In some examples, the multimedia assembly 3008 includes a front-facing camera and/or a rear-facing camera. When the apparatus 3000 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio assembly 3010 is configured to output and/or input an audio signal. For example, the audio assembly 3010 includes a microphone (MIC) configured to receive an external audio signal when the apparatus 3000 is in the operational mode, for example, a calling mode, a recording mode, and a speech recognition mode. The received audio signal may be further stored in the memory 3004 or transmitted via the communication assembly 3016. In some examples, the audio assembly 3010 further includes a speaker for outputting the audio signal.

The I/O interface 3012 provides an interface between the processing assembly 3002 and a peripheral interface module, which may be a keyboard, a click wheel, a button, etc. These buttons may include but are not limited to a home button, a volume button, a start button, and a lock button.

The sensor assembly 3014 includes one or more sensors for providing state assessments of various aspects for the apparatus 3000. For example, the sensor assembly 3014 may detect an on/off state of the apparatus 3000 and relative positioning of the assemblies. For example, the assemblies are a display and a keypad of the apparatus 3000. The sensor assembly 3014 may also detect a change in position of the apparatus 3000 or an assembly of the apparatus 3000, the presence or absence of contact between the user and the apparatus 3000, orientation or acceleration/deceleration of the apparatus 3000, and temperature variation of the apparatus 3000. The sensor assembly 3014 may include a proximity sensor configured to detect presence of nearby objects in the absence of any physical contact. The sensor assembly 3014 may also include a light sensor, for instance, a complementary metal oxide semiconductor (CMOS) or charge coupled device (CCD) image sensor, for use in imaging applications. In some examples, the sensor assembly 3014 may also include an acceleration sensor, a gyroscopic sensor, a magnetic sensor, a pressure sensor, or a temperature sensor.

The communication assembly 3016 is configured to facilitate communications between the apparatus 3000 and other device in a wired or wireless mode. The apparatus 3000 may access a wireless network based on a communication standard, for example, Wi-Fi, 2G, or 3G, or their combination. In an example, the communication assembly 3016 receives a broadcast signal or broadcast related information from an external broadcast management system via a broadcast channel. In an example, the communication assembly 3016 also includes a near field communication (NFC) module to facilitate short-range communication. For example, the NFC module may be implemented based on a radio frequency identification (RFID) technology, an infrared data association (IrDA) technology, an ultra wide band (UWB) technology, a bluetooth (BT) technology, and other technologies.

In the example, the apparatus 3000 may be implemented by one or more application specific integrated circuits (ASICs), a digital signal processor (DSP), a digital signal processing device (DSPD), a programmable logic device (PLD), a field programmable gate array (FPGA), a controller, a microcontroller, a microprocessor, or other electronic elements for executing the method above.

In the example, further provided is a non-transitory computer-readable storage medium including an instruction, for example, a memory 3004 including an instruction, and the instruction may be executed by the processor 3020 of the apparatus 3000 so as to execute the method described above. For example, the non-transitory computer-readable storage medium may be a read-only memory (ROM), a random access memory (RAM), a compact disc read-only memory (CD-ROM), a magnetic tape, a floppy disk, an optical data storage apparatus, etc.

Other implementation solutions of the examples of the disclosure will readily occur to those skilled in the art upon consideration of the specification and practical disclosure. The present application is intended to cover any variations, uses, or adaptations of the examples of the disclosure, and these variations, uses, or adaptations follow general principles of the examples of the disclosure and include common general knowledge or customary technical means in the technical field not disclosed in the examples of the disclosure. The specification and examples are considered as illustrative merely, and a true scope and spirit of the examples of the disclosure are indicated by the following claims.

It is to be understood that the examples of the disclosure is not limited to the precise structure that has been described above and shown in the accompanying drawings, and that various modifications and changes may be made without departing from its scope. The scope of the examples of the disclosure is limited only by the appended claims.

According to an aspect of examples of the disclosure, provided is a method for transmitting transmission block configuration parameter. The method includes:

sending first downlink control information (DCI) for scheduling a multi-transmission time interval transmission block, where the first DCI includes a preset indicator, the preset indicator is used for indicating that a configuration parameter that is used for determining the transmission block size (TBS) of a retransmission transmission block (TB) scheduled by means of the first DCI is from the first DCI or second DCI, and the second DCI is a DCI for scheduling a new transmission TB corresponding to the retransmission TB.

In an example, the preset indicator is used for indicating that a configuration parameter of a modulation and coding scheme (MCS) that is used for determining the TBS of the retransmission TB scheduled by means of the first DCI is from the first DCI or the second DCI.

In an example, when the preset indicator is a first value, the preset indicator is used for indicating that the configuration parameter of the MCS that is used for determining the TBS of the retransmission TB scheduled by means of the first DCI is from the first DCI; and when the preset indicator is a second value, the preset indicator is used for indicating that the configuration parameter of the MCS that is used for determining the TBS of the retransmission TB scheduled by means of the first DCI is from the second DCI.

In an example, the method further includes:

setting the preset indicator as the second value when the retransmission TB scheduled by means of the first DCI is used for performing merged decoding with the new transmission TB.

In an example, the first DCI further includes: a new data indicator (NDI), the NDI being used for indicating that the transmission block scheduled by means of the first DCI and transmitted by means of a physical uplink shared channel (PUSCH) resource is a retransmission TB or a new transmission TB.

According to an aspect of examples of the disclosure, provided is a method for determining transmission block configuration parameter. The method includes:
  receiving first DCI used for scheduling a multi-transmission time interval transmission block; and
  obtaining, according to a preset indicator included in the first DCI, a configuration parameter that is used for determining a TBS of a retransmission TB scheduled by means of the first DCI from the first DCI or second DCI;
  where the second DCI is a DCI for scheduling a new transmission TB corresponding to the retransmission TB.

In an example, the obtaining, according to a preset indicator included in the first DCI, a configuration parameter that is used for determining a TBS of a retransmission TB scheduled by means of the first DCI from the first DCI or second DCI includes:
  obtaining, according to the preset indicator included in the first DCI, a configuration parameter of a modulation and coding scheme (MCS) that is used for determining the TBS of the retransmission TB from the first DCI or the second DCI.

In an example, the obtaining, according to the preset indicator included in the first DCI, a configuration parameter of a modulation and coding scheme (MCS) that is used for determining the TBS of the retransmission TB from the first DCI or the second DCI includes:
  obtaining, from the first DCI when the preset indicator is a first value, the configuration parameter of the MCS that is used for determining the TBS of the retransmission TB; and
  obtaining, from the second DCI when the preset indicator is a second value, the configuration parameter of the MCS that is used for determining the TBS of the retransmission TB.

In an example, the first DCI further includes: a new data indicator (NDI), the NDI being used for indicating that the transmission block scheduled by means of the first DCI and transmitted by means of a physical uplink shared channel (PUSCH) resource is a retransmission TB or a new transmission TB.

According to an aspect of examples of the disclosure, provided is an apparatus for transmitting transmission block configuration parameter. The apparatus includes: a sending module, where the sending module is configured to send first DCI for scheduling a multi-transmission time interval transmission block, the first DCI includes a preset indicator, the preset indicator is used for indicating that a configuration parameter that is used for determining a TBS of a retransmission TB scheduled by means of the first DCI is from the first DCI or second DCI, and the second DCI is a DCI for scheduling a new transmission TB corresponding to the retransmission TB.

In an example, the preset indicator is used for indicating that a configuration parameter of a modulation and coding scheme (MCS) that is used for determining the TBS of the retransmission TB scheduled by means of the first DCI is from the first DCI or the second DCI.

In an example, when the preset indicator is a first value, the preset indicator is used for indicating that the configuration parameter of the MCS that is used for determining the TBS of the retransmission TB scheduled by means of the first DCI is from the first DCI; and when the preset indicator is a second value, the preset indicator is used for indicating that the configuration parameter of the MCS that is used for determining the TBS of the retransmission TB scheduled by means of the first DCI is from the second DCI.

In an example, the apparatus further includes:
  a setting module configured to set the preset indicator as the second value when the retransmission TB scheduled by means of the first DCI is used for performing merged decoding with the new transmission TB.

In an example, the first DCI further includes: a new data indicator (NDI), the NDI being used for indicating that the transmission block scheduled by means of the first DCI and transmitted by means of a physical uplink shared channel (PUSCH) resource is a retransmission TB or a new transmission TB.

According to an aspect of examples of the disclosure, provided is an apparatus for determining transmission block configuration parameter. The apparatus includes: a reception module and an obtaining module, where the reception module is configured to receive first DCI used for scheduling a multi-transmission time interval transmission block; and
  the obtaining module is configured to obtain, according to a preset indicator included in the first DCI, a configuration parameter that is used for determining a TBS of a retransmission TB scheduled by means of the first DCI from the first DCI or second DCI;
  where the second DCI is a DCI for scheduling a new transmission TB corresponding to the retransmission TB.

In an example, the obtaining module includes:
  an obtaining sub-module configured to obtain, according to the preset indicator included in the first DCI, a configuration parameter of a modulation and coding scheme (MCS) that is used for determining the TBS of the retransmission TB from the first DCI or the second DCI.

In an example, the obtaining sub-module includes:
  a first obtaining unit configured to obtain, from the first DCI when the preset indicator is a first value, the configuration parameter of the MCS that is used for determining the TBS of the retransmission TB; and
  a second obtaining unit configured to obtain, from the second DCI when the preset indicator is a second value, the configuration parameter of the MCS that is used for determining the TBS of the retransmission TB.

In an example, the apparatus further includes:
  a determination module configured to determine, according to a new data indicator (NDI) included in the first DCI, the retransmission TB scheduled by means of the first DCI and transmitted by means of a physical uplink shared channel (PUSCH) resource.

The examples of the disclosure provide a parameter transmission method and apparatus, a communication device and a storage medium. A base station sends first DCI for scheduling a multi-transmission time interval transmission block, where the first DCI includes a preset indicator, the preset indicator is used for indicating that a configuration parameter that is used for determining a TBS of a retransmission TB scheduled by means of the first DCI is from the first DCI or second DCI, and the second DCI is a DCI for scheduling a new transmission TB corresponding to the retransmission TB. In this way, for a newly transmitted data block scheduled by means of first DCI, user equipment may use a configuration parameter, used for determining a TBS, in the first DCI without being influenced by a retransmission TB; and for the retransmission TB scheduled by means of the first DCI, a base station may instruct the user equipment to select a configuration parameter that is used for determining the TBS according to whether merged decoding is needed. On one hand, flexibility of selecting a configuration parameter that is used for determining the TBS is improved. On the other hand, the number of bits occupied by a preset indicator does not increase along with an increase of the number of the transmission block scheduled by means of the first DCI, such that an influence of the preset indicator on DCI overhead is reduced, so as to save DCI transmission resources.

What is claimed is:

1. A method for transmitting transmission block configuration parameter, comprising:
sending first downlink control information (DCI) for scheduling a multi-transmission time interval transmission block, wherein the first DCI comprises a preset indicator indicating that a configuration parameter that determines a transmission block size (TBS) of a retransmission transmission block (TB) scheduled by the first DCI is from the first DCI or second DCI, and the second DCI is DCI for scheduling a new transmission TB corresponding to the retransmission TB.

2. The method according to claim 1, wherein
the preset indicator indicates that a configuration parameter of a modulation and coding scheme (MCS) that determines the TBS of the retransmission TB scheduled by the first DCI is from the first DCI or the second DCI.

3. The method according to claim 2, wherein
in response to determining that the preset indicator is a first value, the preset indicator indicates that the configuration parameter of the MCS that determines the TBS of the retransmission TB scheduled by the first DCI is from the first DCI; and
in response to determining that the preset indicator is a second value, the preset indicator indicates that the configuration parameter of the MCS that determines the TBS of the retransmission TB scheduled by the first DCI is from the second DCI.

4. The method according to claim 3, further comprising:
setting the preset indicator as the second value in response to determining that the retransmission TB scheduled by the first DCI performs merged decoding with the new transmission TB.

5. The method according to claim 1, wherein the first DCI further comprises: a new data indicator (NDI) indicating that the TB scheduled by the first DCI and transmitted by a physical uplink shared channel (PUSCH) resource is a retransmission TB or a new transmission TB.

6. A method for determining transmission block configuration parameter, comprising:
receiving first downlink control information (DCI) that schedules a multi-transmission time interval transmission block; and
obtaining, according to a preset indicator comprised in the first DCI, a configuration parameter that determines a transmission block size (TBS) of a retransmission transmission block (TB) scheduled by the first DCI from the first DCI or second DCI,
wherein the second DCI is-a DCI for scheduling a new transmission TB corresponding to the retransmission TB.

7. The method according to claim 6, wherein obtaining, according to the preset indicator comprised in the first DCI, the configuration parameter that determines the TBS of the retransmission TB scheduled by the first DCI from the first DCI or second DCI comprises:
obtaining, according to the preset indicator comprised in the first DCI, a configuration parameter of a modulation and coding scheme (MCS) that determines the TBS of the retransmission TB from the first DCI or the second DCI.

8. The method according to claim 7, wherein obtaining, according to the preset indicator comprised in the first DCI, the configuration parameter of the MCS that determines the TBS of the retransmission TB from the first DCI or the second DCI comprises:
obtaining the configuration parameter of the MCS that determines the TBS of the retransmission TB from the first DCI in response to determining that the preset indicator is a first value; and
obtaining the configuration parameter of the MCS that determines the TBS of the retransmission TB from the second DCI in response to determining that the preset indicator is a second value.

9. The method according to claim 6, wherein the first DCI further comprises: a new data indicator (NDI), the NDI being used for indicating that the TB scheduled by the first DCI and transmitted by a physical uplink shared channel (PUSCH) resource is a retransmission TB or a new transmission TB.

10. A communication device, comprising a processor, a transceiver, a memory, and an executable program stored on the memory and executable by the processor, wherein the processor is configured to:
send first downlink control information (DCI) for scheduling a multi-transmission time interval transmission block, wherein the first DCI comprises a preset indicator indicating that a configuration parameter that determines a transmission block size (TBS) of a retransmission transmission block (TB) scheduled by the first DCI is from the first DCI or second DCI, and the second DCI is DCI for scheduling a new transmission TB corresponding to the retransmission TB.

11. The communication device according to claim 10, wherein
the preset indicator indicates that a configuration parameter of a modulation and coding scheme (MCS) that determines the TBS of the retransmission TB scheduled by the first DCI is from the first DCI or the second DCI.

12. The communication device according to claim 11, wherein
in response to determining that the preset indicator is a first value, the preset indicator indicates that the configuration parameter of the MCS that determines the TBS of the retransmission TB scheduled by the first DCI is from the first DCI; and
in response to determining that the preset indicator is a second value, the preset indicator indicates that the configuration parameter of the MCS that determines the TBS of the retransmission TB scheduled by the first DCI is from the second DCI.

13. The communication device according to claim 12, wherein the processor is further configured to:
set the preset indicator as the second value in response to determining that the retransmission TB scheduled by the first DCI performs merged decoding with the new transmission TB.

14. The communication device according to claim 10, wherein the first DCI further comprises: a new data indicator (NDI) indicating that the TB scheduled by the first DCI and transmitted by a physical uplink shared channel (PUSCH) resource is a retransmission TB or a new transmission TB.

15. A non-transitory storage medium, storing an executable program, wherein the executable program implements, when executed by a processor, steps of the method for transmitting transmission block configuration parameter according to claim 1.

16. A non-transitory storage medium, storing an executable program, wherein the executable program implements, when executed by a processor, steps of the method for determining transmission block configuration parameter according to claim 6.

17. A communication device, comprising a processor, a transceiver, a memory, and an executable program stored on the memory and executable by the processor, wherein the processor executes, when running the executable program, steps of the method for determining transmission block configuration parameter according to claim 6.

* * * * *